US012460824B2

(12) United States Patent
Cadima

(10) Patent No.: US 12,460,824 B2
(45) Date of Patent: Nov. 4, 2025

(54) GAS COOKTOP WITH GRIDDLE ASSEMBLY INCLUDING TEMPERATURE PROBE FOR MONITORING FAILURE MODES

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 422 days.

(21) Appl. No.: 17/993,399

(22) Filed: Nov. 23, 2022

(65) Prior Publication Data

US 2024/0167688 A1 May 23, 2024

(51) Int. Cl.
*F24C 15/36* (2006.01)
*F24C 3/12* (2006.01)
*G05D 23/19* (2006.01)

(52) U.S. Cl.
CPC ......... *F24C 3/126* (2013.01); *G05D 23/1951* (2013.01)

(58) Field of Classification Search
CPC ........ F24C 3/126; F24C 3/027; F24C 15/107; F24C 15/108; G05D 23/1951; F23D 14/46; F23K 5/005; F23N 1/002; F23N 5/022; F23N 2235/12; F23N 2241/08
See application file for complete search history.

(56) References Cited

U.S. PATENT DOCUMENTS 2,785,266 A * 3/1957 Lewis ................... F24C 15/106 219/465.1
5,413,032 A 5/1995 Bruno et al.
7,255,100 B2 8/2007 Repper et al.
8,084,719 B2 12/2011 Ciancimino et al.
9,562,686 B2 2/2017 Arenaza
9,841,191 B2 12/2017 Johncock et al.
10,092,129 B2 * 10/2018 Jenkins ..................... F24C 7/08
10,485,379 B2 11/2019 Bennett et al.
10,584,871 B2 3/2020 Biagioli et al.
10,619,858 B2 4/2020 Paller
10,660,473 B2 5/2020 Dahle et al.
(Continued)

FOREIGN PATENT DOCUMENTS

CN 201241956 Y 5/2009
CN 106871168 B 9/2020
(Continued)

*Primary Examiner* — Gregory A Wilson
(74) *Attorney, Agent, or Firm* — Dority & Manning, P.A.

(57) ABSTRACT

A gas cooktop includes a primary gas burner, an auxiliary gas burner positioned adjacent to the primary gas burner, a fuel supply system, a griddle positioned over the primary gas burner and the auxiliary gas burner, and a temperature probe configured for receipt within the griddle proximate the auxiliary gas burner. A controller is configured to initiate operation of the fuel supply system in the auto griddle mode where a flow of fuel is supplied to operate the primary gas burner and the auxiliary gas burner at a target heat level, obtain a griddle temperature of the griddle using the temperature probe, identify a heating failure based at least in part on the griddle temperature, and implement a responsive action in response to identifying the heating failure.

18 Claims, 5 Drawing Sheets

(56) References Cited

U.S. PATENT DOCUMENTS

| | | | | |
|---|---|---|---|---|
| 10,935,250 | B2 | 3/2021 | Andueza et al. | |
| 11,015,813 | B2 | 5/2021 | Billman et al. | |
| 11,109,709 | B2 | 9/2021 | Lee et al. | |
| 11,204,173 | B2 * | 12/2021 | Trice | F24C 15/18 |
| 11,435,086 | B2 * | 9/2022 | Cadima | F23K 5/007 |
| 11,649,969 | B2 * | 5/2023 | Cadima | F24C 3/027<br>126/39 G |
| 11,852,354 | B2 * | 12/2023 | Cadima | F24C 3/085 |
| 11,906,171 | B2 * | 2/2024 | Cadima | F23K 5/005 |
| 11,906,172 | B1 * | 2/2024 | Santana | F23N 1/005 |
| 2002/0073985 | A1 | 6/2002 | Leukhardt et al. | |
| 2002/0175213 | A1 * | 11/2002 | Wodeslavsky | F24C 3/126<br>236/20 A |
| 2009/0235918 | A1 * | 9/2009 | Espina | F23Q 9/045<br>126/39 G |
| 2013/0305933 | A1 | 11/2013 | Heidrich et al. | |
| 2018/0338644 | A1 | 11/2018 | Gossens et al. | |
| 2019/0309954 | A1 | 10/2019 | Andueza et al. | |
| 2020/0300507 | A1 | 9/2020 | Cowan et al. | |
| 2020/0408413 | A1 | 12/2020 | Billman et al. | |
| 2021/0148575 | A1 | 5/2021 | Cadima | |
| 2021/0254834 | A1 | 8/2021 | Bhogal et al. | |
| 2021/0274968 | A1 | 9/2021 | Steiner et al. | |
| 2021/0285649 | A1 * | 9/2021 | Billman | F24C 3/126 |
| 2022/0007889 | A1 | 1/2022 | Cadima | |
| 2024/0164578 | A1 * | 5/2024 | Cadima | F24C 3/126 |

FOREIGN PATENT DOCUMENTS

| | | | |
|---|---|---|---|
| CN | 111692408 | A | 9/2020 |
| EP | 2896329 | B1 | 12/2018 |
| ES | 2725174 | T3 | 9/2019 |
| JP | H10246424 | A | 9/1998 |
| JP | 2015062666 | A | 4/2015 |
| JP | 2022013345 | A | 1/2022 |
| WO | WO2020008088 | A2 | 1/2020 |

* cited by examiner

GAS COOKTOP WITH GRIDDLE ASSEMBLY INCLUDING TEMPERATURE PROBE FOR MONITORING FAILURE MODES

FIELD OF THE INVENTION

The present subject matter relates generally to gas cooktops, and more particularly, to the use of multiple gas burners to uniformly heat a griddle assembly.

BACKGROUND OF THE INVENTION

Conventional gas cooktop appliances have one or more gas burners, e.g., positioned at a cooktop surface for use in heating or cooking an object, such as a cooking utensil and its contents. These gas burners typically combust a mixture of gaseous fuel and air to generate heat for cooking. These gas cooktops may include a grate or other support structure for receiving various cooking utensils, such as a griddle. For example, griddles may be positioned on the grate of the gas cooktop and may extend across multiple gas burners to provide a large, flat cooking surface.

Notably, when the griddle extends over multiple gas burners, each burner must be activated and controlled to provide uniform heat to the griddle. Many gas cooktops have individual control inputs for each heating element, e.g., such as control knobs or dials utilizing analog inputs to adjust heat output or flame size. Thus, identically controlling two or more gas heating elements with independent analog inputs to provide even heating is difficult. The gas burners may be synced or configured to operate at the same heat output, but the fuel supply conduits and control valves that facilitate this syncing process may fail. Moreover, detection of such a failure may be difficult, resulting in uneven heating of the griddle, poor cooking performance, and potentially hazardous situations.

Conventional gas cooktops may include a griddle having a removable temperature probe that is received within the griddle for providing temperature feedback, e.g., to facilitate a closed loop cooking cycle using the griddle. However, the positioning of the temperature probes within the griddle is typically limited to the griddle ends, where excessive heating of the probes from burner heat may be avoided. As a result, a single temperature probe at an end of the griddle may not be capable of detecting failures of more than one burner, and the use of multiple temperature probes may be costly and cumbersome.

Accordingly, a gas cooktop including a removable griddle with temperature measuring capabilities would be useful. More specifically, a temperature probe that may be conveniently used with a griddle on a gas cooktop to identify failures in gas burners would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gas cooktop defining a vertical direction, a lateral direction, and a transverse direction is provided. The gas cooktop includes a primary gas burner, an auxiliary gas burner positioned adjacent to the primary gas burner, a fuel supply system that is operably coupled to the primary gas burner and the auxiliary gas burner, the fuel supply system being configured to operate in an auto griddle mode where a flow of fuel is supplied to operate the primary gas burner and the auxiliary gas burner at a target heat level, a griddle positioned over the primary gas burner and the auxiliary gas burner, the griddle defining a probe receptacle proximate the auxiliary gas burner, a temperature probe configured for receipt within the probe receptacle, and a controller in operative communication with the fuel supply system and the temperature probe. The controller is configured to initiate operation of the fuel supply system in the auto griddle mode, obtain a griddle temperature of the griddle using the temperature probe, identify a heating failure based at least in part on the griddle temperature, and implement a responsive action in response to identifying the heating failure.

In another exemplary embodiment, a method for operating a gas cooktop is provided. The gas cooktop includes a primary gas burner, an auxiliary gas burner, a fuel supply system, and a griddle assembly comprising a griddle and a temperature probe positioned proximate the auxiliary gas burner. The method includes initiating operation of the fuel supply system in an auto griddle mode where a flow of fuel is supplied to operate the primary gas burner and the auxiliary gas burner at a target heat level, obtaining a griddle temperature of the griddle using the temperature probe, identifying a heating failure based at least in part on the griddle temperature, and implementing a responsive action in response to identifying the heating failure.

According to still another exemplary embodiment, a gas cooktop defining a vertical direction, a lateral direction, and a transverse direction is provided. The gas cooktop includes a primary gas burner and an auxiliary gas burner positioned adjacent to the primary gas burner, a griddle assembly comprising a griddle positioned over the primary gas burner and the auxiliary gas burner and a temperature probe positioned proximate the auxiliary gas burner, a manifold for supplying a flow of fuel, a primary supply line providing fluid communication between the manifold and the primary gas burner, an auxiliary supply line providing fluid communication between the manifold and the auxiliary gas burner, a bridge line providing fluid communication between the primary supply line and the auxiliary supply line, a supplemental line providing fluid communication between the manifold and the bridge line, a bridge line valve operably coupled to the bridge line for regulating the flow of fuel through the bridge line, a supplemental line valve operably coupled to the supplemental line for regulating the flow of fuel through the supplemental line, and a controller in operative communication with the temperature probe. The controller is configured to initiate an operation of the bridge line valve and the supplemental line valve in an auto griddle mode where the flow of fuel is supplied to operate the primary gas burner and the auxiliary gas burner at a target heat level, obtain a griddle temperature of the griddle using the temperature probe, determine that the griddle temperature changes at a rate that is below a predetermined heating rate when the auto griddle mode is initiated, identify a heating failure corresponding to a failure of the bridge line valve to open, and implement a responsive action in response to identifying the heating failure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
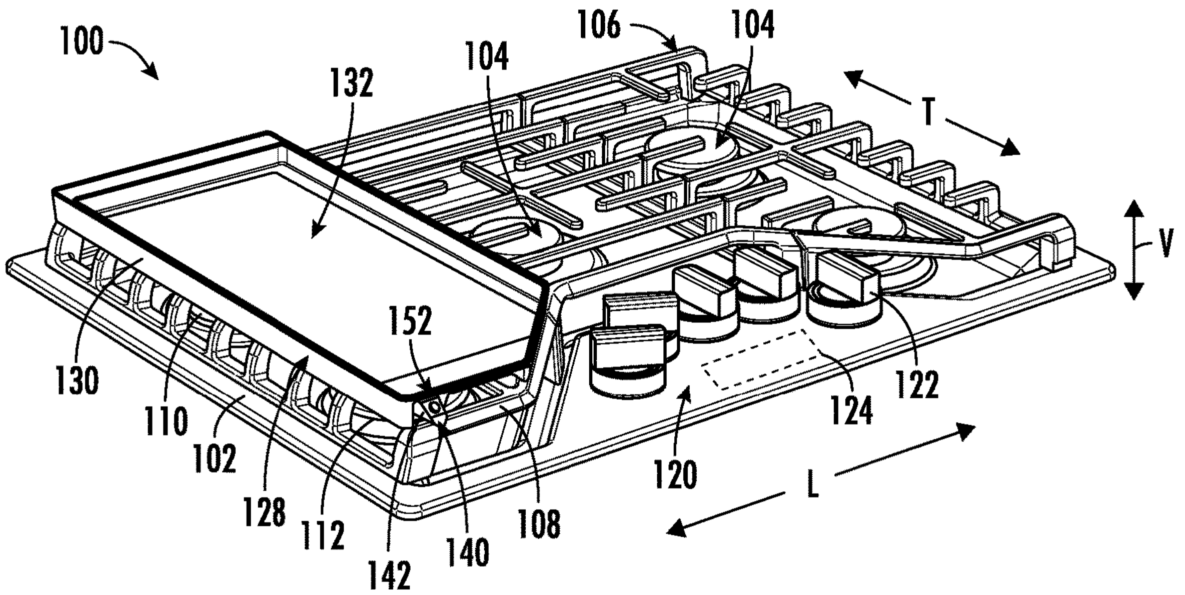
FIG. 1 provides a perspective view of a gas cooktop including a griddle assembly according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a cooktop appliance, e.g., a gas cooktop 100, of the present disclosure. Gas cooktop 100 may be fitted integrally with a surface of a kitchen counter, may be configured as a slide-in cooktop unit, may be a part of a free-standing range cooking appliance, etc. Gas cooktop 100 may generally define a vertical direction V, a lateral direction L, and a transverse direction T, each of which is mutually perpendicular, such that an orthogonal coordinate system is generally defined. References to the horizontal direction or plane may refer generally to the plane defined by the lateral direction L and the transverse direction T.

Gas cooktop 100 includes a top panel 102 that includes one or more heating sources, such as heating elements 104 for use in, e.g., heating or cooking. Top panel 102, as used herein, refers to any upper surface of gas cooktop 100 over which utensils may be heated and therefore food cooked. In general, top panel 102 may be constructed of any suitably rigid and heat resistant material capable of supporting heating elements 104, cooking utensils, and/or other components of gas cooktop 100. By way of example, top panel 102 may be constructed of enameled steel, stainless steel, glass, ceramics, and combinations thereof.

According to the illustrated embodiment, the heating elements 104 of gas cooktop 100 are gas burners. However, although referred to as "gas cooktop" herein, it should be appreciated that aspects of the present subject matter may be applicable to other cooktop appliances, e.g., such as electrical resistance cooktops, inductive cooktops, etc. In addition, gas cooktop 100 may include one or more grates 106 configured to support a cooking utensil, such as a pot, pan, etc. In general, grates 106 include a plurality of elongated members 108, e.g., formed of cast metal, such as cast iron. The cooking utensil may be placed on the elongated members 108 of each grate 106 such that the cooking utensil rests on an upper surface of elongated members 108 during the cooking process. Heating elements 104 are positioned underneath the various grates 106 such that heating elements 104 provide thermal energy to cooking utensils above top panel 102 by combustion of fuel below the cooking utensils.

In some embodiments, the heating elements 104 of gas cooktop 100 may include a plurality of gas burners that are positioned on and/or within top panel 102 and have various sizes, as shown in FIG. 1, so as to provide for the receipt of cooking utensils (i.e., pots, pans, etc.) of various sizes and configurations and to provide different heat inputs for such cooking utensils. For example, the gas cooktop 100 may include a first gas burner, referred to herein as primary gas burner 110, disposed on the top panel 102 and a second gas burner, referred to herein as auxiliary gas burner 112, spaced apart from the primary gas burner 110 on the top panel 102. For example, as illustrated, the primary gas burner 110 and the auxiliary gas burner 112 may be aligned along the transverse direction T. The top panel 102 may also include a recessed portion, e.g., which extends downward along the vertical direction V. The primary gas burner 110 and the auxiliary gas burner 112 may be positioned within the recessed portion. The recessed portion may collect spilled material, e.g., foodstuffs, during operation of the gas cooktop 100.

In the illustrated example embodiments, each gas burner 110, 112 includes a generally circular shape from which a flame may be emitted. As shown, each gas burner 110, 112 includes a plurality of fuel ports defined circumferentially in fluid communication with an internal passage of each respective gas burner 110, 112. In some embodiments, one or both of the primary gas burner 110 and the auxiliary gas burner 112 may be a multi-ring burner. For example, the primary gas burner 110 may include a first plurality of fuel ports defining a first ring of the primary gas burner 110 and a second plurality of fuel ports defining a second ring of the primary gas burner 110. In such embodiments, a first fuel chamber in fluid communication with the first plurality of fuel ports may be separated from a second fuel chamber in fluid communication with the second plurality of fuel ports by a wall within the primary gas burner 110, and fuel may be selectively supplied to one or both of the fuel chambers within primary gas burner 110. In some embodiments of a cooktop appliance, multiple burners of differing types may be provided in combination, e.g., one or more single-ring burners as well as one or more multi-ring burners. Moreover, other suitable burner configurations are also possible.

According to the illustrated example embodiment, a user interface panel or control panel 120 is located within convenient reach of a user of gas cooktop 100. For this example embodiment, control panel 120 includes control knobs 122 that are each associated with one of heating elements 104. Control knobs 122 allow the user to activate each heating element 104 and regulate the amount of heat input each heating element 104 provides to a cooking utensil located thereon. Although gas cooktop 100 is illustrated as including control knobs 122 for controlling heating elements 104, it will be understood that control knobs 122 and the configuration of gas cooktop 100 shown in FIG. 1 is provided by way of example only. More specifically, control panel 120 may include various input components, such as one or more of a variety of touch-type controls, electrical, mechanical or electro-mechanical input devices including rotary dials, push buttons, and touch pads.

According to the illustrated embodiment, control knobs 122 are located within control panel 120 of gas cooktop 100. However, it should be appreciated that this location is used only for the purpose of explanation, and that other locations and configurations of control panel 120 and control knobs 122 are possible and within the scope of the present subject matter. Indeed, according to alternative embodiments, control knobs 122 may instead be located directly on top panel 102 or elsewhere on gas cooktop 100, e.g., on a backsplash, front bezel, or any other suitable surface of gas cooktop 100. Control panel 120 may also be provided with one or more graphical display devices, such as a digital or analog display device designed to provide operational feedback to a user.

Referring again to FIG. 1, operation of the gas cooktop 100 may be regulated by a controller 124 that is operably coupled to (i.e., in operative communication with) the user inputs (e.g., control knobs 122) and/or heating elements 104. In this regard, control panel 120, control knobs 122, and other suitable inputs/outputs may be in communication with controller 124 such that controller 124 may regulate operation of gas cooktop 100. For example, signals generated by controller 124 may operate gas cooktop 100, including any or all system components, subsystems, or interconnected devices, in response to the position of control knobs 122 and other control commands. Control panel 120 and other components of gas cooktop 100 may be in communication with controller 124 via, for example, one or more signal lines or shared communication busses. In this manner, Input/Output ("I/O") signals may be routed between controller 124 and various operational components of gas cooktop 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 124 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 124 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 124 may be operable to execute programming instructions or micro-control code associated with an operating cycle of gas cooktop 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 124 as disclosed herein is capable of and may be operable to perform any methods, method steps, or portions of methods as disclosed herein. For example, in some embodiments, methods disclosed herein may be embodied in programming instructions stored in the memory and executed by controller 124.

The memory devices may also store data that can be retrieved, manipulated, created, or stored by the one or more processors or portions of controller 124. The data can include, for instance, data to facilitate performance of methods described herein. The data can be stored locally (e.g., on controller 124) in one or more databases and/or may be split up so that the data is stored in multiple locations. In addition, or alternatively, the one or more database(s) can be connected to controller 124 through any suitable network(s), such as through a high bandwidth local area network (LAN) or wide area network (WAN). In this regard, for example, controller 124 may further include a communication module or interface that may be used to communicate with one or more other component(s) of gas cooktop 100, controller 124, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

As shown in FIGS. 1 through 4, gas cooktop 100 may further include a griddle assembly 128 that may be installed on gas cooktop 100 as a cooking utensil. In general, griddle assembly 128 may include a griddle 130 that it selectively disposed over (e.g., directly above) one or more spaced-apart heating elements 104. For example, according to the illustrated embodiment, griddle 130 is positioned over a pair of burners, e.g., primary gas burner 110 and auxiliary gas burner 112 to define a single, flat cooking surface collectively heated by gas burners 110, 112. Specifically, during use, a top surface 132 of griddle 130 (i.e., a cooking surface) faces away from top panel 102 to receive a cooking item (e.g., food) thereon. By contrast, a bottom surface 134 may be opposite from top surface 132 and faces top panel 102 during use. Thus, the bottom surface 134 may face top panel 102 to receive a thermal output from the corresponding burners 110, 112.

Figure 4:
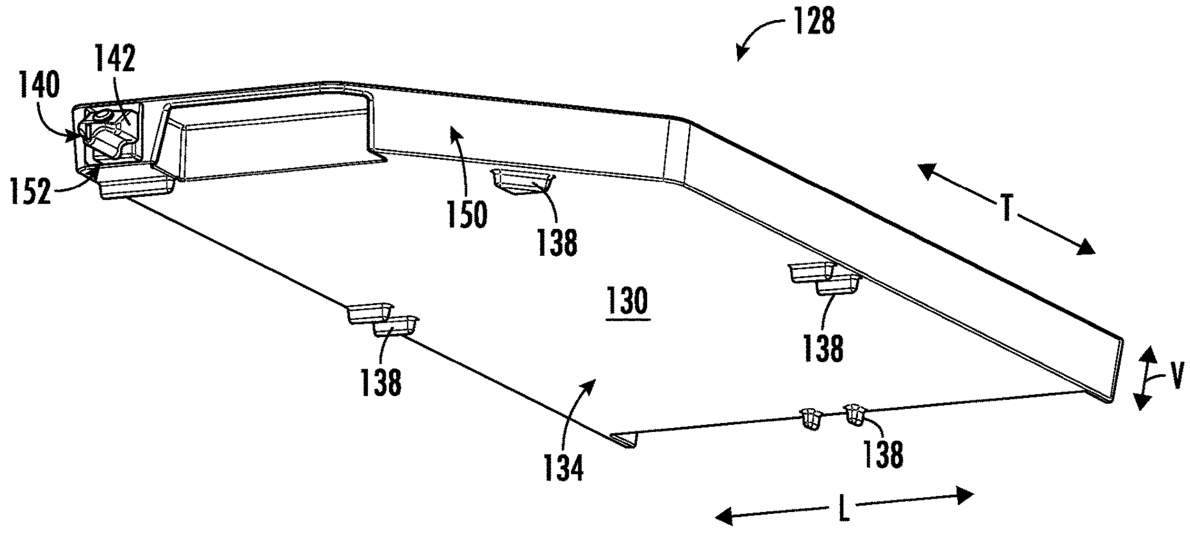
FIG. 4 provides a bottom, perspective view of the exemplary temperature probe of FIG. 3 in the exemplary griddle assembly of FIG. 1 according to example embodiments of the present subject matter.

The bottom surface 134 of the griddle 130 may be supported by grate 106 when positioned on gas cooktop 100. For example, bottom surface 134 of the griddle 130 may be in contact with one or more elongated members 108 of grate 106, such as with a peripheral support surface and an intermediate support surface thereof. In addition, it should be appreciated that grate 106 and/or griddle 130 may define complementary features to facilitate proper positioning and alignment of griddle 130 on gas cooktop 100. In this regard, grate 106 may define engagement features (e.g., such as elongated members 108) and griddle 130 may define complementary features (e.g., such as a geometry of outer side 150 or feet 138 as shown in FIG. 4), such that the engagement features and the complementary features are configured to engage when griddle 130 is mounted on grate 106 to secure the position of griddle 130. For example, the edges or perimeter of griddle 130 may have a complementary footprint designed for seating on elongated members 108 of grate 106. In addition, or alternatively, feet 138 may be sized and positioned on bottom surface 134 of griddle 130 to securely engage elongated members 108 when griddle 130 is properly positioned on grate 106. Grate 106 and griddle 130 may further define one or more protrusions and complementary detents, complementary ribs and grooves, etc.

Griddle 130 may be formed from any material that is suitably rigid and suitable for high temperature cooking operations. In this regard, for example, griddle 130 may be formed from a nonferrous material, such as aluminum alloy. According to still other embodiments, griddle 130 may be formed from a ferrous material, such as cast iron or stainless steel. Other materials and griddle constructions are possible and within the scope of the present subject matter.

In some embodiments, gas cooktop 100 may be configured for closed-loop cooking. For example, controller 124 may be operable to receive a set temperature (such as from a user input of the gas cooktop 100 or wirelessly from a remote device such as a smartphone) and compare the set temperature to temperature measurements from one or more temperature sensors, such as a temperature sensor associated with a cooking utensil (such as griddle 130), to each gas burner 110, 112. Controller 124 may be further programmed to automatically adjust each burner, such as a fuel flow rate to each burner, based on the comparison of the corresponding temperature measurement to the set temperature.

Accordingly, gas cooktop 100 or griddle assembly 128 may include a removably embedded temperature sensor 140 to provide temperature feedback to facilitate such a closed loop cooking process. For example, according to the illustrated embodiment, temperature sensor 140 may generally include a sensor housing 142 and a temperature probe 144 extending therefrom for receipt within griddle 130, as described in more detail below. In general, sensor housing 142 may contain operating electronics and a wireless communication module, e.g., for communicating with controller 124 of gas cooktop 100. For example, the sensor housing 142 and temperature probe 144 may be formed as a single, hermetically sealed package.

As used herein, "temperature sensor" or the equivalent is intended to refer to any suitable type of temperature measuring system or device positioned at any suitable location for measuring the desired temperature. Thus, for example, temperature sensor 140 may each be any suitable type of temperature sensor, such as a thermistor, a thermocouple, a resistance temperature detector, a semiconductor-based integrated circuit temperature sensor, etc. In addition, temperature sensor 140 may be positioned at any suitable location and may output a signal, such as a voltage, to a controller that is proportional to and/or indicative of the temperature being measured. Although exemplary positioning of temperature sensors is described herein, it should be appreciated that gas cooktop may include any other suitable number, type, and position of temperature sensors according to alternative embodiments.

As shown, griddle 130 may be configured to removably and securely receive temperature sensor 140. For example, as illustrated in the figures, griddle 130 may define an outer side 150, e.g., an outer perimeter of griddle 130 within a horizontal plane (e.g., defined by the lateral direction L and the transverse direction T). Temperature sensor 140 may be slidably received within griddle 130 through outer side 150. More specifically, for example, griddle 130 may define a probe receptacle 152 within outer side 150. Probe receptacle 152 may generally include a probe channel 154 that is configured for slidably receiving temperature probe 144 and a housing recess 156 that is generally configured for receiving sensor housing 142.

According to example embodiments, probe receptacle 152 may be designed to securely receive temperature sensor 140 in a predetermined orientation. In this regard, probe receptacle 152 and temperature sensor 140 may be "poka-yoked," or designed such that improper installation of temperature sensor 140 is unlikely or not possible at all. In this regard, for example, housing recess 156 may have a specific geometry or footprint that corresponds to the geometry of sensor housing 142, e.g., such that sensor housing 142 may only be received within housing recess 156 in a particular orientation. In addition, temperature probe 144 may be offset relative to a center of sensor housing 142 and probe channel 154 may be similarly offset relative to housing recess 156. In this manner, temperature sensor 140 may need to be oriented in a particular manner for receipt within probe receptacle 152. Other means for ensuring proper alignment and installation of temperature sensor are possible and within the scope of the present subject matter.

Figure 2:
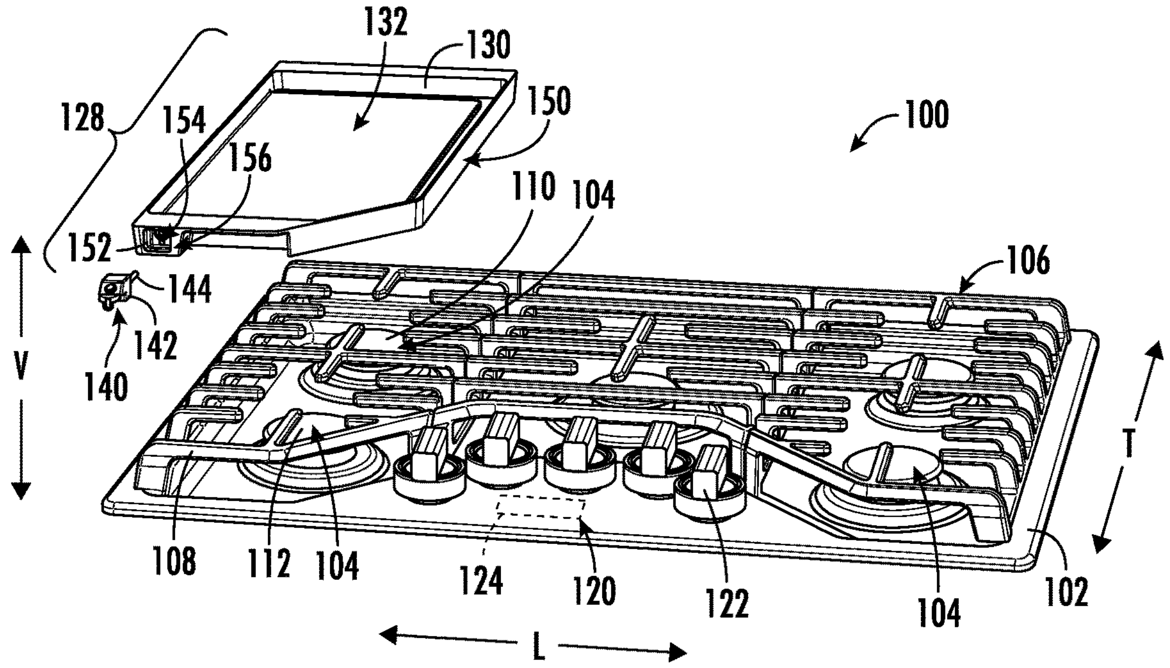
FIG. 2 illustrates the exemplary griddle assembly of FIG. 1 separated from the exemplary gas cooktop of FIG. 1 according to example embodiments of the present subject matter.
Figure 3:
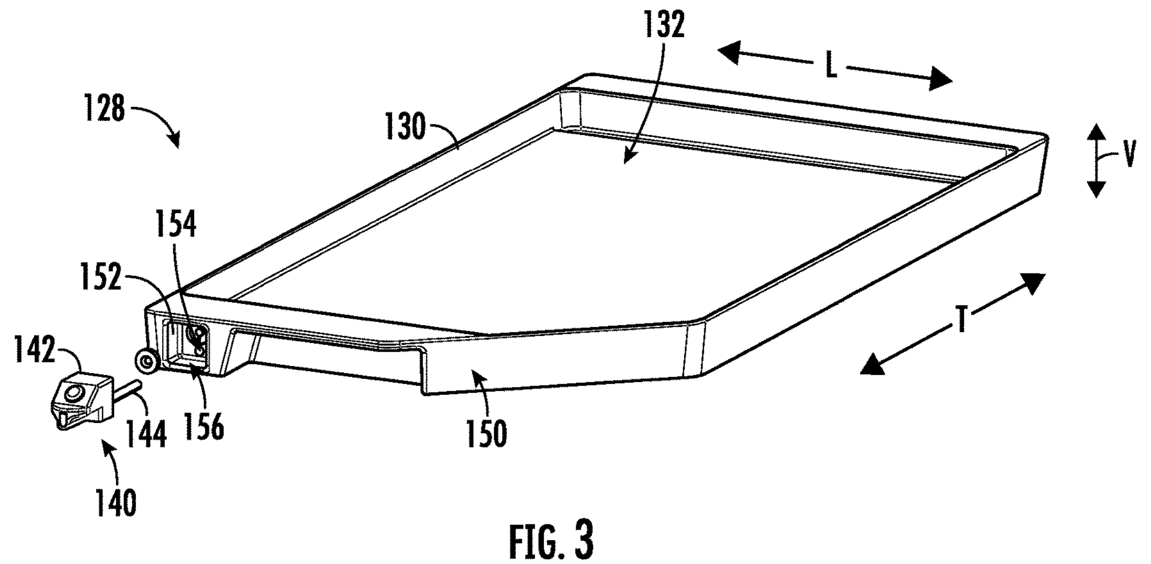
FIG. 3 provides a top, perspective view of a temperature probe removed from the exemplary griddle assembly of FIG. 1 according to example embodiments of the present subject matter.

It should be appreciated that probe receptacle 152 may be positioned at any suitable location on griddle 130. According to the example illustrated embodiments, probe receptacle is defined on a front side (e.g., forward along the transverse direction) of outer side 150, e.g., to facilitate ease of manipulation by a consumer. In addition, probe receptacle 152 may be defined on a front, corner of griddle 130 (e.g., on a front, left corner as shown in FIG. 2) or at a center of griddle 130 along the lateral direction (not shown). In this manner, temperature sensor 140 may be maintained at a suitable distance from auxiliary gas burner 112, thereby lowering its operating temperature and extending its operating lifetime.

As explained above, gas cooktop 100 may use temperature feedback to facilitate a closed loop cooking process on a cooking utensil, such as griddle 130. In this regard, for example, controller 124 may be in operative communication with temperature sensor 140, e.g., via a wireless communication protocol, to receive real time temperature measurements of griddle 130. As explained in more detail below with respect to FIG. 5, gas cooktop 100 may further include a fuel supply system 200 that includes a system of fuel supply conduits and associated valve assemblies that may regulate the flow of fuel to primary gas burner 110 and auxiliary gas burner. Although an exemplary fuel supply system 200 is illustrated in the drawings and described herein, it should be appreciated that variations and modifications may be made while remaining within the scope of the present subject matter.

According to example embodiments, controller 124 may generally be configured to operate in a "manual control" mode of operation, e.g., where the flow of fuel passed to each burner 110, 112 is independently controlled by the position of a corresponding control knob 122. For example, this may be the standard mode of operation when heating a cooking utensil on a single heating element 104. However, when heating a cooking utensil than spans two or more heating elements 104, such as griddle 130 positioned over primary gas burner 110 and auxiliary gas burner 112, it may be desirable to regulate the operation of fuel supply system 200 to ensure that the flow of fuel supplied to each gas burner 110, 112 facilitates even heating of the entire surface of the griddle 130. Accordingly, controller 124 may be further configured to operate in an "auto griddle" mode of operation, whereby fuel supply system 200 is regulated by controller 124 to achieve a target heat level of griddle 130.

Controller 124 may be configured to enter the "auto griddle" or the "griddle mode" through any suitable trigger or instruction. According to example, embodiments, griddle mode may be entered when the control knobs 122 associated with primary gas burner 110 and auxiliary gas burner 112 are rotated to an auto griddle or griddle mode position. More specifically, referring now to FIGS. 6 through 9, each control knob 122 may include a manual input knob 210 that is rotatable by a user of the appliance to adjust operation of gas cooktop 100. In this regard, according to the example embodiment illustrated in FIG. 6, manual input knob 210 associated with primary gas burner 110 may be generally rotatable about an axis A. Control knob 122 may further include a temperature control ring, e.g., a temperature input ring 212. The temperature input ring 212 may also be rotatable about an axis. The axis of the temperature input ring 212 may be coaxial with the axis A of the manual input knob 210.

The manual input knob 210 may include indicia 214 which corresponds with a relative operating condition of gas cooktop 100. For instance, the indicia 214 may correspond with a low temperature, marked as "LO," a high temperature, marked as "HI," a simmer temperature, marked as "SIM," and an automatic operating mode, marked as "AUTO GRIDDLE." For the embodiments described herein, it should be understood that the "AUTO GRIDDLE" input may correspond to a minimum flow of fuel (e.g., as provided by a supply valve to a gas burner). Thus, when manual input knob 210 is turned to "AUTO GRIDDLE," the supply valve (described below) provides a minimum flow of fuel (e.g., gas) to the corresponding gas burner.

Figure 6:
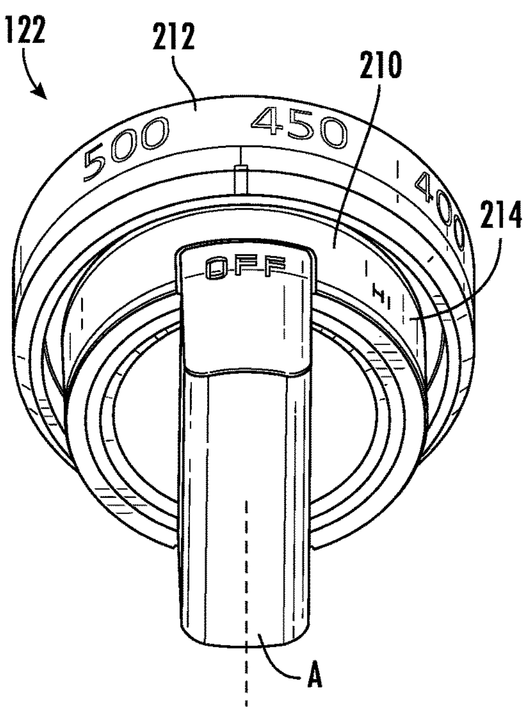
FIG. 6 is a perspective view of a knob for controlling the exemplary fuel supply system of FIG. 5 in accordance with an example embodiment of the present disclosure, as seen in a first position associated with a manual operating mode.
Figure 7:
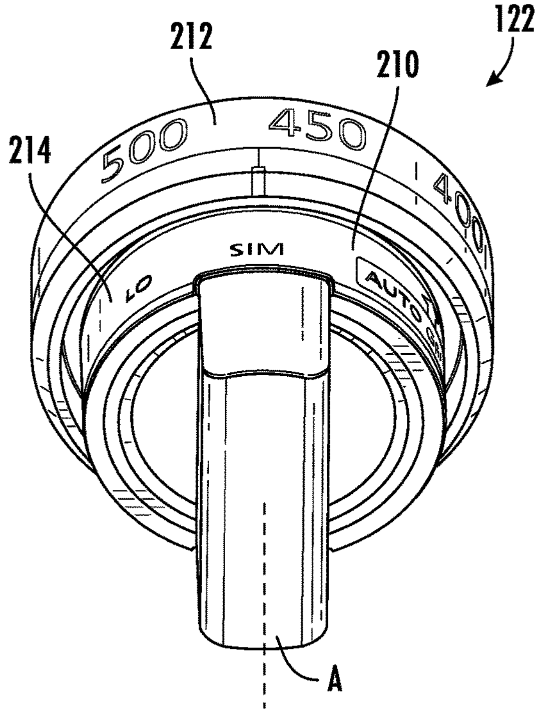
FIG. 7 is a perspective view of the knob for controlling the exemplary fuel supply system of FIG. 5 in accordance with an example embodiment of the present disclosure, as seen in a second position associated with the manual operating mode.
Figure 8:
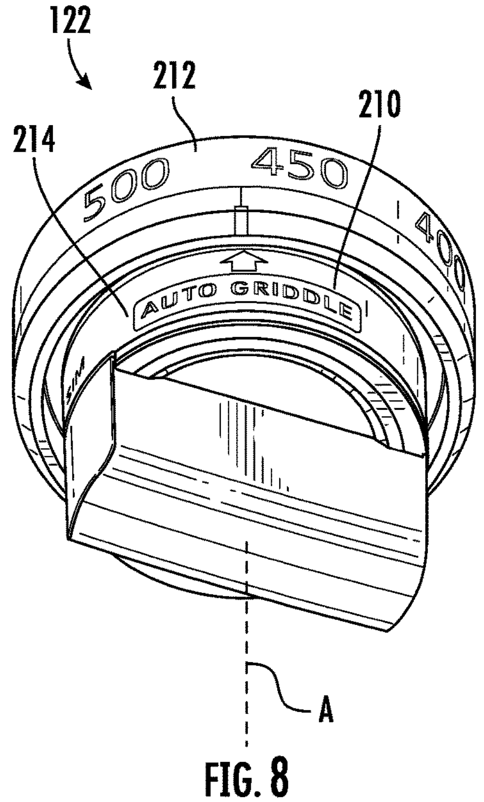
FIG. 8 is a perspective view of the knob for controlling the exemplary fuel supply system of FIG. 5 in accordance with an example embodiment of the present disclosure, as seen in a position associated with an automatic operating mode.
Figure 9:
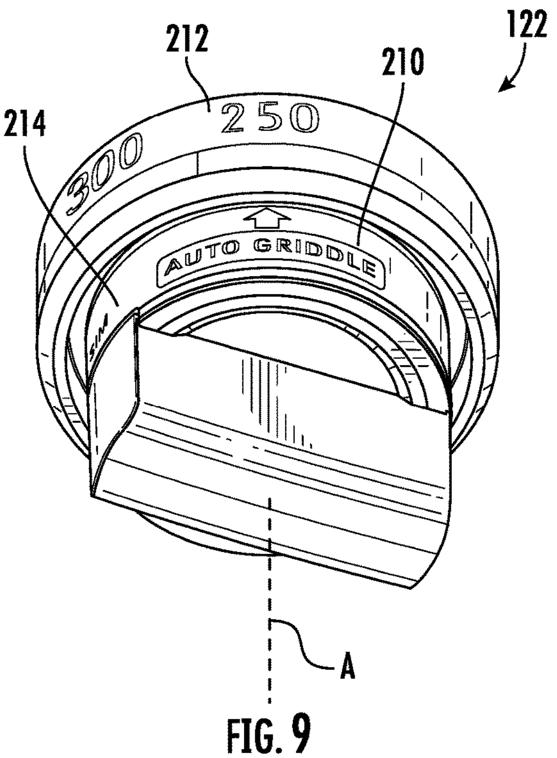
FIG. 9 is a perspective view of the knob for controlling the exemplary fuel supply system of FIG. 5 in accordance with an example embodiment of the present disclosure, as seen in a position associated with the automatic operating mode.

The manual input knob 210 illustrated in FIG. 6 is disposed in the OFF position whereby a corresponding gas burner (e.g., burner 110, 112) receives no gas flow. The manual input knob 210 illustrated in FIG. 7 is in a simmer mode whereby the cooktop appliance is operating in a manual mode at a simmer setting. The manual input knob 210 illustrated in FIG. 8 is in an automatic operating mode (e.g., AUTO GRIDDLE mode) with the temperature input ring 212 set for approximately 465 degrees Fahrenheit. The manual input knob 210 illustrated in FIG. 9 is in the automatic operating mode (e.g., AUTO GRIDDLE mode) with the temperature input ring 212 set for approximately 250 degrees Fahrenheit.

According to example embodiments, manual input knob 210 may be infinitely adjustable. That is, the manual input knob 210 may be adjustable to any location between rotational end points or stops. It should be understood that rotating the manual input knob 210 between the HI and SIM settings may allow for the operator to adjust the flame to any desired flame height. In certain instances, the cooktop appliance may include tactile feedback when the manual input knob 210 is rotated from the manual operating mode to the automatic operating mode. The tactile feedback may include, for example, a detent or the like which causes a tactile indication when manual input knob 210 rotates to the automatic operating mode position.

When manual input knob 210 is positioned in the automatic operating mode (e.g., AUTO GRIDDLE mode), the operating temperature may be regulated by rotating temperature input ring 212. It should be understood that the temperature input ring 212 may be set before or after the manual input knob 210 is set to the automatic operating mode. Moreover, the operator may adjust the temperature input ring 212 after the manual input knob 210 is in the automatic operating mode position, thereby allowing the operator to change the temperature or heat level of heating elements 104 being controlled in this mode.

Although griddle mode is described above as being entered and regulated using control knobs 122, according to still other example embodiments, griddle mode may be entered and controlled in any other suitable manner. For example, a user may instruct controller 124 to enter the griddle mode by pressing a button, interacting with a touch screen display, or providing a command via a mobile software application (e.g., a software application on the user's cell phone). In addition, after the griddle mode is entered, the user will have the opportunity to or be prompted to enter a target heat level for the griddle 130 during the griddle mode of operation. For example, the user could input a target heat level in degrees Fahrenheit or select a generic heating range, e.g., such as low, medium-low, medium, medium-high, high, etc.

Referring again to FIG. 5, fuel supply system 200 will be described in more detail according to example embodiments of the present subject matter. As shown, fuel supply system 200 may include a manifold 220 that is in fluid communication with a fuel supply 222 for providing the flow of fuel. Manifold 220 may be provided within, e.g., top panel 102 of gas cooktop 100. Manifold 220 may include a gas inlet 224 through which gas or fuel is supplied to manifold 220 from fuel supply 222, for instance, a municipal gas source. Accordingly, manifold 220 may be a conduit through which the gas or fuel may flow (e.g., at a predetermined pressure).

Fuel supply system 200 may include a primary supply valve 226. Primary supply valve 226 may be fluidly connected with manifold 220. For instance, the gas flowing through manifold 220 may be selectively supplied to primary supply valve 226. Primary supply valve 226 may be a manual valve controlled by a relative angular position of the manual input knob 210. With primary supply valve 226 in the fully open position and fuel supply system 200 in manual operating mode, gas can flow at a maximum flow rate to, e.g., primary gas burner 110. With primary supply valve 226 in the closed position in manual operating mode, gas may not flow to primary gas burner 110. Thus, the closed position of the primary supply valve 226 may restrict or halt gas flow to primary gas burner 110. In certain instances, manifold 220 may supply gas flow to one or more other control assemblies which may be tapped into or connected with manifold 220.

Fuel supply system 200 may include a primary supply line 228. Primary supply line 228 may fluidly connect primary supply valve 226 with primary gas burner 110. In detail, primary supply line 228 may be in upstream fluid communication with primary gas burner 110 to direct fuel thereto. Primary supply line 228 may be a conduit defining a passageway or channel through which the fuel (e.g., gas) is selectively supplied to primary gas burner 110. For instance, an amount of fuel supplied through primary supply line 228 may be dictated by a relative position of primary supply valve 226 (e.g., as influenced by manual input knob 210).

Fuel supply system 200 may include an auxiliary supply valve 230. Auxiliary supply valve 230 may be fluidly connected with manifold 220. For instance, the gas flowing through manifold 220 may be selectively supplied to auxiliary supply valve 230. Auxiliary supply valve 230 may be a manual valve controlled by a relative angular position of the manual input knob 210. With auxiliary supply valve 230 in the fully open position and fuel supply system 200 in manual operating mode, gas can flow at a maximum flow rate to, e.g., auxiliary gas burner 112. With auxiliary supply valve 230 in the closed position in manual operating mode, gas may not flow to auxiliary gas burner 112. Thus, the closed position of the auxiliary supply valve 230 may restrict or halt gas flow to auxiliary gas burner 112. In certain instances, manifold 220 may supply gas flow to one or more other control assemblies which may be tapped into or connected with manifold 220.

Fuel supply system 200 may include an auxiliary supply line 232. Auxiliary supply line 232 may fluidly connect auxiliary supply valve 230 with auxiliary gas burner 112. In detail, auxiliary supply line 232 may be in upstream fluid communication with auxiliary gas burner 112 to direct fuel thereto. Auxiliary supply line 232 may be a conduit defining a passageway or channel through which the fuel (e.g., gas) is selectively supplied to auxiliary gas burner 112. For instance, an amount of fuel supplied through auxiliary supply line 232 may be dictated by a relative position of auxiliary supply valve 230 (e.g., as influenced by manual input knob 210). Additionally or alternatively, auxiliary supply line 232 may be in fluid parallel with primary supply line 228. Each of primary supply valve 226 and auxiliary supply valve 230 may be controlled by a dedicated control manual input knob 210, e.g., for independent control of primary gas burner 110 and auxiliary gas burner 112.

Figure 5:
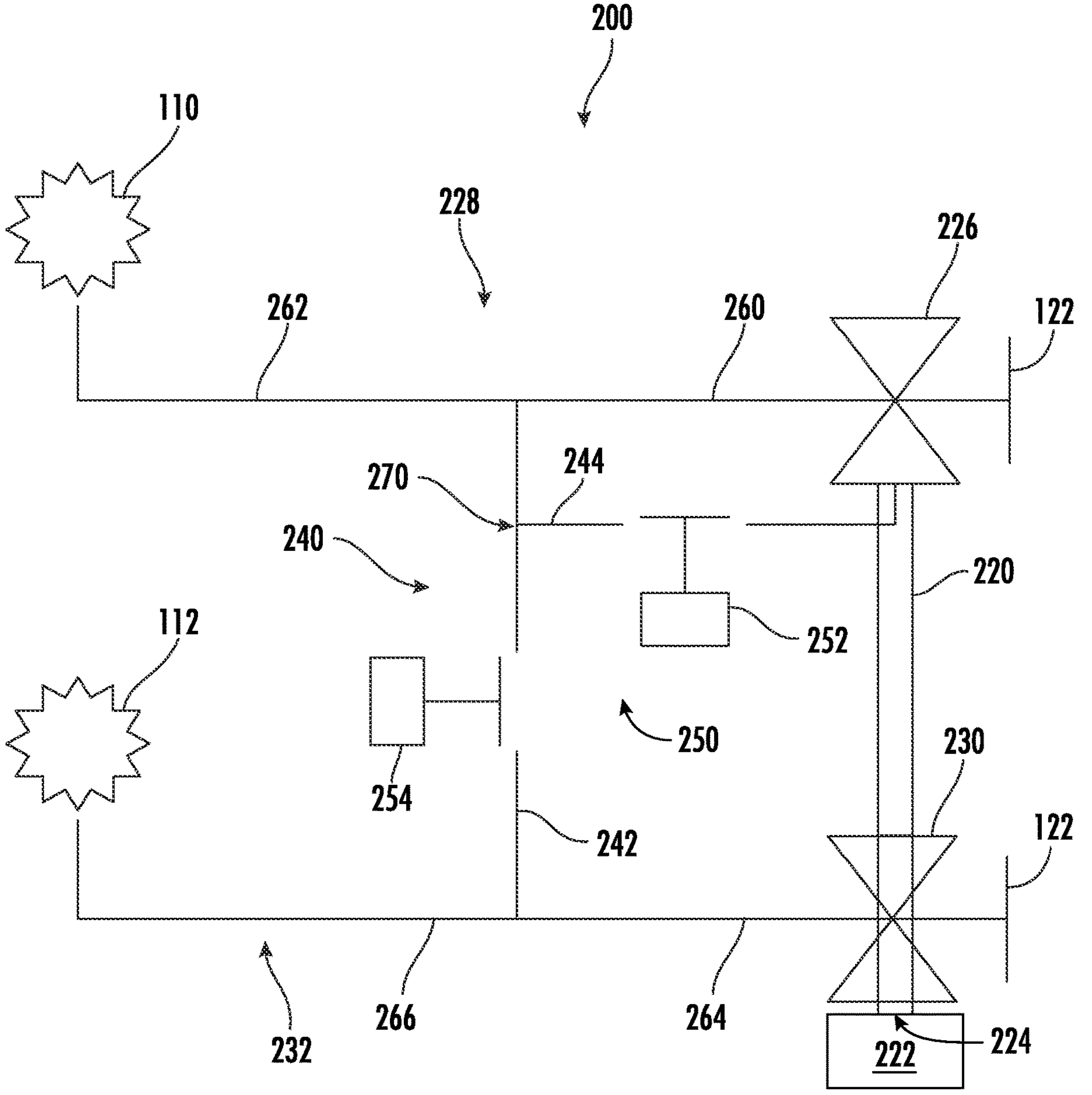
FIG. 5 is a schematic view of the gas burners and fuel supply system of the exemplary gas cooktop of FIG. 1 according to example embodiments of the present subject matter.

Referring still to FIG. 5, fuel supply system 200 may include a fuel balancing circuit 240 fluidly coupled to manifold 200, primary supply line 228, and auxiliary supply line 232. In general, fuel balancing circuit 240 is intended to supply primary gas burner 110 and auxiliary gas burner 112 with flows of fuel that achieve uniform heating of griddle 130 in the auto griddle mode. In this regard, fuel balancing circuit 240 may provide a fluid connection from primary supply valve 226 to each of primary supply line 228 and auxiliary supply line 232 (e.g., during an automatic control operation). In detail, fuel balancing circuit 240 may have a first end connected at primary supply valve 226. According to some embodiments, the first end of fuel balancing circuit 240 is fluidly coupled to an outlet of primary supply valve 226. Fuel balancing circuit 240 may be a fixed flow line. In detail, fuel balancing circuit 240 may constantly receive a manifold pressure of fuel or gas (e.g., a maximum pressure within manifold 220). Accordingly, fuel balancing circuit 240 may selectively provide a predetermined amount of fuel to each of primary supply line 228 and auxiliary supply line 232.

Fuel balancing circuit 240 may include a bridge line 242 and a supplemental line 244. In detail, bridge line 242 may connect primary supply line 228 to auxiliary supply line 232. Supplemental line 244 may fluidly connect bridge line 242 to primary supply valve 226. Thus, supplemental line 244 may extend from primary supply valve 226 to bridge line 242 to supply the fuel thereto. Bridge line 242 may then supply the fuel to each of primary supply line 228 and auxiliary supply line 232. Advantageously, when fuel balancing circuit 240 is active, a matching fuel pressure may be supplied to each of primary gas burner 110 and auxiliary gas burner 112. For example, when operating in the griddle mode, a griddle plate (e.g., griddle 130) covering primary gas burner 110 and auxiliary gas burner 112 may be more evenly heated by increasing or decreasing the heat output of primary gas burner 110 and auxiliary gas burner 112 in concert.

Fuel supply system 200 may include a valve assembly 250 that is operably coupled to fuel balancing circuit 240 for regulating the flow of fuel flowing therethrough. In this regard, for example, valve assembly 250 may include a supplemental line valve 252 that is operably coupled to supplemental line 244 for regulating the flow of fuel therethrough. For instance, supplemental line valve 252 may be positioned between primary supply valve 226 and bridge line 242, e.g., to selectively open and close fuel balancing circuit 240. Accordingly, when supplemental line valve 252 is opened, fuel is supplied to each of primary supply line 228 and auxiliary supply line 232 (e.g., at a matching pressure or amount to each). Similarly, when supplemental line valve 252 is closed, the supplemental fuel (e.g., at manifold pressure) is not supplied to either primary supply line 228 or auxiliary supply line 232. Supplemental line valve 252 may be operably connected with controller 124. For instance, supplemental line valve 252 may selectively open and/or close according to an input signal from controller 124.

Additionally or alternatively, supplemental line valve 252 may selectively open and/or close according to an input from a control knob 122 (e.g., control knob 122 associated with primary gas burner 110). For example, if a user rotates control knob 122 associated with primary gas burner 110 to the "AUTO GRIDDLE" setting, a signal is sent to supplemental line valve 252 to open (e.g., during a griddle operation mode). More specifically, when the griddle mode is initiated, controller 124 may implement a closed loop feedback control system, e.g., by opening supplemental line valve 252 when the temperature of griddle 130 (e.g., measured by temperature sensor 140) falls below the target temperature (e.g., as set by temperature input ring 212). By contrast, if the temperature of griddle 130 exceeds the target temperature, controller 124 may close supplemental line valve 252. By modulating or pulsing the operation of supplemental line valve 252 on and off, the temperature of griddle 130 may be maintained at the target temperature due to the flow of fuel through fuel balancing circuit 240.

According to some embodiments, fuel supply system 200 includes a bridge valve. Bridge line valve 254 may be provided on bridge line 242. In detail, bridge line valve 254 may be positioned between auxiliary supply line 232 and a connection point 270 between supplemental line 244 and bridge line 242. Accordingly, bridge line valve 254 may selectively open or close a fluid communication between supplemental line 244 and auxiliary supply line 232. For example, when only primary gas burner 110 is operational, bridge line valve 254 is closed to prohibit a flow of supplemental fuel from supplemental line 244 to auxiliary supply line 232. Thus, in the griddle mode, bridge line valve 254 is opened to allow fluid communication between supplemental line 244 and auxiliary supply line 232.

Supplemental line valve 252 may be a solenoid valve. For instance, supplemental line valve 252 may be a normally closed solenoid valve. Supplemental line valve 252 may be controllable between a fully closed position and a fully open position. Accordingly, supplemental fuel from manifold 220 may be selectively supplied to primary supply line 228 or each of primary supply line 228 and auxiliary supply line 232 at an equal pressure. Bridge line valve 254 may be a solenoid valve. For instance, bridge line valve 254 may be a normally closed solenoid valve. Bridge line valve 254 may be controllable between a fully closed position and a fully open position. Accordingly, supplemental fuel from manifold 220 may be selectively supplied to auxiliary supply line 232 according to the position of bridge line valve 254. For instance, when bridge line valve 254 is closed, only primary gas burner 110 may be cycled between a high and a low setting (e.g., high and low flame output). Auxiliary gas burner 112 may be prohibited from receiving fuel from fuel balancing circuit 240 due to the closed position of bridge line valve 254.

Primary supply line 228 may include a first portion 260 and a second portion 262. In detail, first portion 260 may extend from primary supply valve 226. The flow of fuel from primary supply valve 226 may thus enter first portion 260 of primary supply line 228. Bridge line 242 of fuel balancing circuit 240 may connect with primary supply line 228 at a terminus of first portion 260. For instance, fuel supplied from primary supply valve 226 into first portion 260 may selectively mix with supplemental fuel supplied into fuel balancing circuit 240 (e.g., via bridge line 242). Accordingly, second portion 262 may selectively include fuel from first portion 260 and bridge line 242. For example, during an operation (e.g., an automatic operation), a minimum flow is supplied to primary gas burner 110 through primary supply line 228. A maximum flow may be temporarily added to the minimum flow via fuel balancing circuit 240 by opening supplemental line valve 252. Thus, a heat output of primary gas burner 110 may be controlled via supplemental line valve 252 without an adjustment of control knob 122 associated with primary gas burner 110.

Auxiliary supply line 232 may include a first portion 264 and a second portion 266. In detail, first portion 264 may extend from auxiliary supply valve 230. The flow of fuel from auxiliary supply valve 230 may thus enter first portion 264 of auxiliary supply line 232. Bridge line 242 of fuel balancing circuit 240 may connect with auxiliary supply line 232 at a terminus of first portion 264. For instance, fuel supplied from auxiliary supply valve 230 into first portion 264 may selectively mix with supplemental fuel supplied into fuel balancing circuit 240 (e.g., via bridge line 242). Accordingly, second portion 266 may selectively include fuel from first portion 264 and bridge line 242. For example, during an operation (e.g., an automatic operation), a minimum flow is supplied to auxiliary gas burner 112 through auxiliary supply line 232. A maximum flow may be temporarily added to the minimum flow via fuel balancing circuit 240 by opening supplemental line valve 252. Thus, a heat output of auxiliary gas burner 112 may be controlled via supplemental line valve 252 without an adjustment of control knob 122 associated with auxiliary gas burner 112.

FIG. 5 illustrates fuel balancing circuit 240 as including bridge line valve 254, e.g., to prevent flow between primary supply line 228 and auxiliary supply line 232 in a manual operating mode, to prevent backflow into supplemental line 244, etc. However, it should be appreciated that fuel balancing circuit 240 may include any other suitable number of conduits, valves, check valves, or other flow regulating features for achieving the same purpose. For example, according to alternative embodiments, fuel balancing circuit 240 may include a pair of check valves, each being positioned on bridge line 242 opposite of the connection point 270 where supplemental line 244 connects to bridge line 242. For instance, these check valves may allow fuel to flow from supplemental line 244 into primary supply line 228 and/or auxiliary supply line 232 while prohibiting fuel from flowing in the reverse direction. Advantageously, fuel may not be inadvertently supplied to an unused burner (e.g., when only primary gas burner 110 is used) via fuel balancing circuit 240.

As mentioned above, gas cooktop 100 may selectively operate in a griddle mode. The griddle mode may include placing or attaching a griddle plate (e.g., griddle 130) over each of primary and auxiliary burners 110 and 112. To facilitate the closed loop griddle mode, temperature sensor 140 may be included on griddle 130. Specifically, according to the illustrated embodiment, temperature sensor 140 is positioned on a front end of griddle 130, e.g., facilitating quick and easy user access. For example, auxiliary gas burner 112 may be positioned between probe receptacle 152 and primary gas burner 110 when griddle 130 is installed on gas cooktop 100. More specifically, probe receptacle 152 may be defined at a front corner of the griddle 130. In this manner, temperature sensor 140 is particularly suited for obtaining a temperature of griddle 130 proximate the front end of griddle 130, or otherwise obtaining temperature measurements that may be associated with or more proportionally controlled by the operation of auxiliary gas burner 112 than primary gas burner 110. As explained in more detail below, this configuration may be particularly useful for identifying faults with fuel supply system 200, and more particularly, faults with fuel balancing circuit 240.

During operation, controller 124 may determine that gas cooktop 100 has been instructed to enter an automatic or closed loop cooking cycle, such as the auto griddle mode. For example, controller 124 may determine that control knobs 122 associated with primary gas burner 110 and auxiliary gas burner 112 have both been set to the AUTO GRIDDLE position. In addition, controller 124 may determine that the griddle 130 has been placed on grates 106 via one or more sensors (e.g., temperature sensors, proximity sensors, contact sensors, etc.), after which controller 124 may establish a connection with temperature sensor 140 for receiving temperature feedback. Additionally or alternatively, controller 124 may detect the presence of griddle 130 via one or more other means, such as a wireless connection between griddle 130 and gas cooktop 100, a camera, a weight sensor, an optic sensor, a proximity sensor, or the like.

After confirming that the auto griddle mode has been activated and that griddle 130 is properly positioned on grate 106, controller may implement the closed loop griddle cooking process. In this regard, as explained above, a minimum flow of fuel may be supplied through first portion 260 of primary supply line 228 and first portion 264 of auxiliary supply line 232. Simultaneously, controller 124 may regulate valve assembly 250 of fuel balancing circuit 240 to supply additional fuel to both primary supply line 228 and auxiliary supply line 232, e.g., to maintain the griddle temperature at a target temperature. For example, this target temperature may be selected using temperature input ring 212.

Now that the construction of gas cooktop 100 and the configuration of fuel supply system 200 and controller 124 according to exemplary embodiments have been presented, an exemplary method 300 of operating a gas cooktop will be described. Although the discussion below refers to the exemplary method 300 of operating gas cooktop 100, one skilled in the art will appreciate that the exemplary method 300 is applicable to the operation of a variety of other cooking appliances. In exemplary embodiments, the various method steps as disclosed herein may be performed by controller 124 or a separate, dedicated controller.

Figure 10:
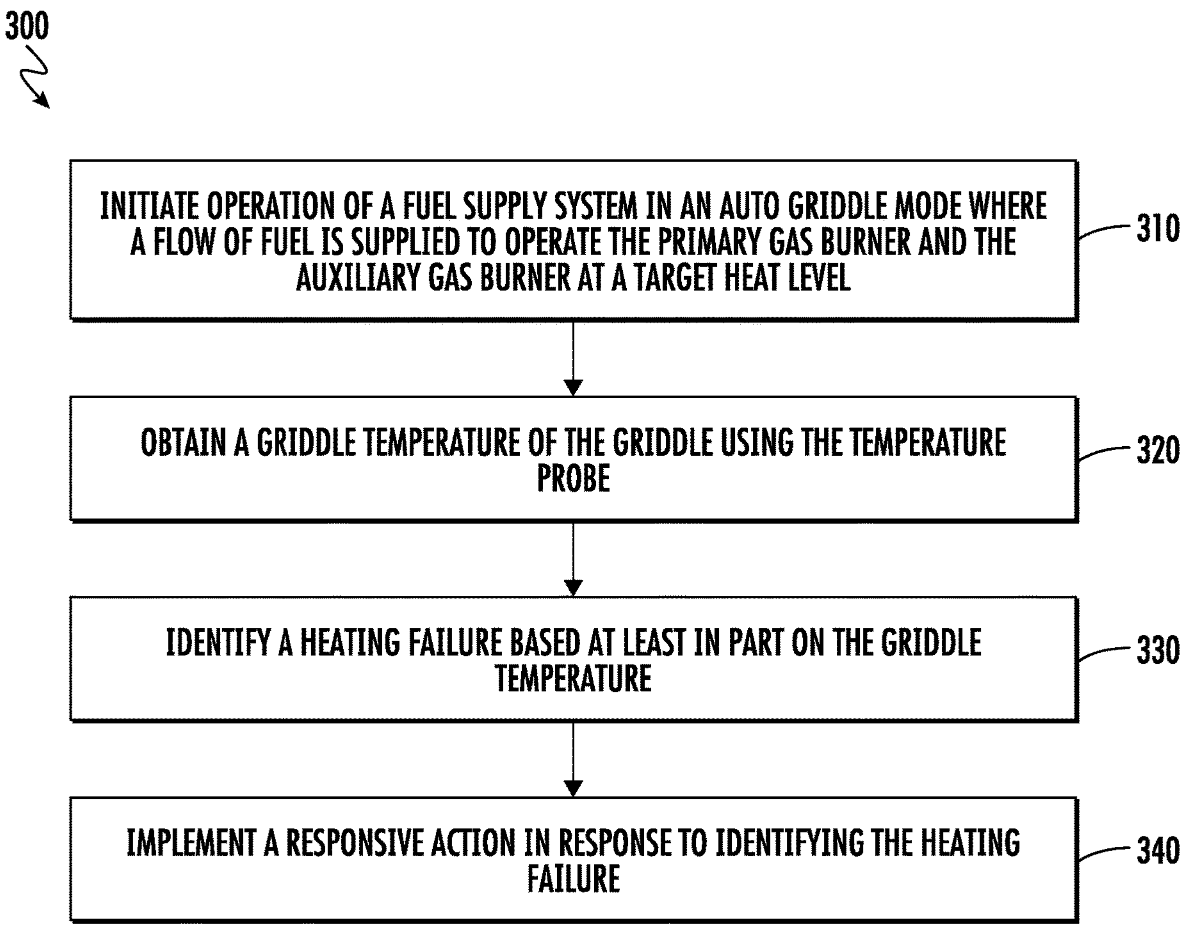
FIG. 10 illustrates a method for operating a gas cooktop in accordance with one embodiment of the present disclosure.

Referring now to FIG. 10, method 300 includes, at step 310, initiating operation of a fuel supply system in an auto griddle mode where a flow of fuel is supplied to operate a primary gas burner and an auxiliary gas burner at a target heat level. For example, continuing the example from above, controller 124 may initiate the auto griddle mode when primary gas burner 110 and auxiliary gas burner 112 are set to operate in the AUTO GRIDDLE mode. In addition, the target heat level may be regulated according to input from the temperature input ring 212 or through any other suitable user input.

As explained above, operation in the auto griddle mode may include selectively opening and closing valve assembly 250 of fuel balancing circuit 240 to supply flows of fuel that achieve even heat output from primary gas burner 210 and auxiliary gas burner 212. Specifically, this auto griddle mode may be achieved by supplementing the minimum flow of fuel through primary supply valve 226 and auxiliary supply valve 230 with fuel from fuel balancing circuit 240, e.g., by regulating bridge line valve 254 and supplemental line valve 252.

Notably, bridge line valve 254 and supplemental line valve 252 may be solenoid valves that move between the open position and the closed position but do not provide positional feedback to controller 124. Notably, these valves may periodically fail, resulting in poor cooking performance or potentially hazardous conditions. Accordingly, aspects of the present subject matter are directed to methods for determining when such a failure has occurred and taking remedial action. For example, the failure detection method may rely on temperature feedback from temperature sensor 140.

Accordingly, step 320 may include obtaining a griddle temperature of the griddle using the temperature probe. As explained above, temperature sensor 140 may be positioned for monitoring the side of griddle 130 closest to the front edge or proximate auxiliary gas burner 112. So positioned, temperature sensor 140 may be particularly suited for identifying various faults associated with fuel balancing circuit 240. Thus, step 330 includes identifying a heating failure based at least in part on the griddle temperature. Exemplary faults are described below, but it should be appreciated that the present subject matter is not limited to detecting only these example faults.

According to an example embodiment, identifying the heating failure based on the griddle temperature may include determining that there is no significant change in the griddle temperature when the auto griddle mode is operating (e.g., no temperature change greater than a couple degrees or beyond a predetermined threshold). In this regard, when the auto griddle mode is initiated, supplemental line valve 252 and bridge line valve 254 may open simultaneously to provide a full flow of fuel to both primary gas burner 110 and auxiliary gas burner 112. Accordingly, if there is no significant change in temperature in response to a change in heating, this indicates that supplemental line valve 252 failed to open, so the heating failure may be identified as the failure of supplemental line valve 252 to open.

According to an example embodiment, identifying the heating failure based on the griddle temperature may include determining that the griddle temperature increases when the auto griddle mode calls for reduced heating. In this regard, when the auto griddle mode is operating and a temperature target has been satisfied, supplemental line valve 252 may close, such that only the minimum flow of fuel continues to flow to both primary gas burner 110 and auxiliary gas burner 112. Accordingly, if the griddle temperature continues to increase, this may indicate that supplemental line valve 252 is stuck in the open position. Accordingly, the heating failure may be identified as the failure of supplemental line valve 252 to close.

According to an example embodiment, identifying the heating failure based on the griddle temperature may include determining that the griddle temperature changes at a rate that is below a predetermined heating rate when the auto griddle mode is initiated. In this regard, when the auto griddle mode is initiated, supplemental line valve 252 and bridge line valve 254 may open simultaneously to provide a full flow of fuel to both primary gas burner 110 and auxiliary gas burner 112. If the supplemental line valve 252 opens but the bridge line valve 254 stays closed, primary gas burner 110 will heat while auxiliary gas burner 112 will remain at the minimum flow state. Notably, the rate of temperature change when only half of the griddle is heated may be identifiable by controller (e.g., by a predetermined rate of change, by a temperature threshold, etc.). For example, identifying this heating failure mode may include determining that the griddle rate of heating falls below the target rate by greater than a predetermined threshold. Accordingly, the heating failure may be identified as the failure of bridge line valve 254 to open. Notably, positioning temperature sensor 140 at the front of griddle 130 as described herein allows for sensing of this failure mode. By contrast, placing temperature sensor 140 at another location, e.g., proximate primary gas burner 110, may not be as effective, as the rate of heating would be much larger at that location.

Step 340 may include implementing a responsive action in response to identifying the heating failure. In this regard, implementing the responsive action may include shutting off all fuel flow within gas cooktop 100, e.g., using a master supply valve. In addition, or alternatively, implementing the responsive action may include providing a user notification regarding the heating failure, e.g., via a display or via wireless communication with a user's mobile device. Other suitable responsive actions are possible and within the scope of the present subject matter.

FIG. 10 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using gas cooktop 100 as an example, it should be appreciated that this method may be applied to the operation of any gas cooking appliance.

As explained herein, aspects of the present subject matter are generally directed to a griddle for use on a gas cooking appliance, where the griddle includes a removable wireless temperature probe. Either one or multiple burners may be used to heat the griddle and the temperature probe may be used to provide temperature feedback to facilitate a closed loop control scheme. The griddle may have a rectangular shape, a handle at two ends, and a receptacle at one end of griddle to house the wireless temperature probe. The temperature probe can be removed before cleaning the griddle.

The burners may include an extra outlet that provides manifold pressure at the lowest valve setting. This outlet may feed a master solenoid that controls the flow of gas from the extra outlet to one or both burners depending on the mode of operation. The griddle's temperature sensor may be positioned at the slave end burner of the gas cooktop, where the fault is detectable when only half of the griddle is heated and only if the probe is on slave end when the slave solenoid valve fails to open. Here, the master burner operates when the slave burner fails. This fault detection can thereby be identified easily.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas cooktop defining a vertical direction, a lateral direction, and a transverse direction, the gas cooktop comprising:
- a primary gas burner;
- an auxiliary gas burner positioned adjacent to the primary gas burner;
- a fuel supply system that is operably coupled to the primary gas burner and the auxiliary gas burner, the fuel supply system being configured to operate in an auto griddle mode where a flow of fuel is supplied to operate the primary gas burner and the auxiliary gas burner at a target heat level;
- a griddle positioned over the primary gas burner and the auxiliary gas burner, the griddle defining a probe receptacle proximate the auxiliary gas burner;
- a temperature probe configured for receipt within the probe receptacle; and
- a controller in operative communication with the fuel supply system and the temperature probe, the controller being configured to:
  - initiate operation of the fuel supply system in the auto griddle mode;
  - obtain a griddle temperature of the griddle using the temperature probe;
  - identify a heating failure based at least in part on the griddle temperature, wherein identifying the heating failure comprises determining that there is no significant change in the griddle temperature when the auto griddle mode is operated and identifying the heating failure as the failure of a supplemental line valve to open; and
  - implement a responsive action in response to identifying the heating failure.

2. The gas cooktop of claim 1, wherein the fuel supply system further comprises:
- a manifold in fluid communication with a fuel supply for providing the flow of fuel;
- a primary supply line providing fluid communication between the manifold and the primary gas burner;
- an auxiliary supply line providing fluid communication between the manifold and the auxiliary gas burner;
- a fuel balancing circuit fluidly coupled to the manifold, the primary supply line, and the auxiliary supply line; and
- a valve assembly for regulating the flow of fuel through the primary supply line, the auxiliary supply line, and the fuel balancing circuit.

3. The gas cooktop of claim 2, wherein the fuel balancing circuit comprises:
- a bridge line providing fluid communication between the primary supply line and the auxiliary supply line; and a supplemental line providing fluid communication between the primary supply valve and the bridge line.

4. The gas cooktop of claim 3, wherein the valve assembly comprises:

a primary supply valve provided on the primary supply line for regulating the flow of fuel to through the primary supply line;

an auxiliary supply valve provided on the auxiliary supply line for regulating the flow of fuel to through the auxiliary supply line;

a bridge line valve operably coupled to the bridge line for regulating the flow of fuel through the bridge line; and a supplemental line valve operably coupled to the supplemental line for regulating the flow of fuel through the supplemental line.

5. The gas cooktop of claim 4, wherein the supplemental line valve and the bridge line valve are normally closed solenoid valves.

6. The gas cooktop of claim 5, wherein operating in the auto griddle mode comprises opening the bridge line valve and the supplemental line valve.

7. The gas cooktop of claim 1, wherein identifying the heating failure comprises:

determining that the griddle temperature increases when the auto griddle mode does not call for heat; and identifying the heating failure as the failure of a supplemental line valve to close.

8. The gas cooktop of claim 1, wherein identifying the heating failure comprises:

determining that the griddle temperature changes at a rate that is below a predetermined heating rate when the auto griddle mode is operated; and identifying the heating failure as the failure of a bridge line valve to open.

9. The gas cooktop of claim 1, wherein identifying the heating failure comprises:

determining that the griddle temperature falls below the target temperature by greater than a predetermined threshold.

10. The gas cooktop of claim 1, further comprising:

a grate positioned over the gas burner, wherein the griddle is seated on the grate, and wherein the grate defines engagement features and the griddle defines complementary features, the engagement features and the complementary features configured to engage when the griddle is properly mounted on the grate to secure the griddle.

11. The gas cooktop of claim 1, wherein the auxiliary gas burner is positioned between the probe receptacle and the primary gas burner when the griddle is installed on the gas cooktop.

12. The gas cooktop of claim 1, wherein the probe receptacle is defined at a front corner of the griddle.

13. The gas cooktop of claim 1, wherein implementing the responsive action comprises:

stopping an operation of the gas cooktop or providing a user notification regarding the heating failure.

14. A method for operating a gas cooktop, the gas cooktop comprising a primary gas burner, an auxiliary gas burner, a fuel supply system, and a griddle assembly comprising a griddle and a temperature probe positioned proximate the auxiliary gas burner, the method comprising:

initiating operation of the fuel supply system in an auto griddle mode where a flow of fuel is supplied to operate the primary gas burner and the auxiliary gas burner at a target heat level;

obtaining a griddle temperature of the griddle using the temperature probe;

identifying a heating failure based at least in part on the griddle temperature, wherein identifying the heating failure comprises determining that the griddle temperature changes at a rate that is below a predetermined heating rate when the auto griddle mode is operated and identifying the heating failure as the failure of a bridge line valve to open; and implementing a responsive action in response to identifying the heating failure.

15. The method of claim 14, wherein the fuel supply system further comprises: a manifold in fluid communication with a fuel supply for providing the flow of fuel; a primary supply line providing fluid communication between the manifold and the primary gas burner; an auxiliary supply line providing fluid communication between the manifold and the auxiliary gas burner; a fuel balancing circuit fluidly coupled to the manifold, the primary supply line, and the auxiliary supply line; a valve assembly for regulating the flow of fuel through the primary supply line, the auxiliary supply line, and the fuel balancing circuit, wherein the fuel balancing circuit comprises: a bridge line providing fluid communication between the primary supply line and the auxiliary supply line; and a supplemental line providing fluid communication between the primary supply valve and the bridge line, and wherein the valve assembly comprises: a primary supply valve provided on the primary supply line for regulating the flow of fuel to through the primary supply line; an auxiliary supply valve provided on the auxiliary supply line for regulating the flow of fuel to through the auxiliary supply line; a bridge line valve operably coupled to the bridge line for regulating the flow of fuel through the bridge line; and a supplemental line valve operably coupled to the supplemental line for regulating the flow of fuel through the supplemental line.

16. The method of claim 14, wherein identifying the heating failure comprises:

determining that the griddle temperature falls below the target heat level by greater than a predetermined threshold.

17. The method of claim 14, wherein implementing the responsive action comprises:

stopping an operation of the gas cooktop or providing a user notification regarding the heating failure.

18. A gas cooktop defining a vertical direction, a lateral direction, and a transverse direction, the gas cooktop comprising:

a primary gas burner and an auxiliary gas burner positioned adjacent to the primary gas burner;

a griddle assembly comprising a griddle positioned over the primary gas burner and the auxiliary gas burner and a temperature probe positioned proximate the auxiliary gas burner;

a manifold for supplying a flow of fuel;

a primary supply line providing fluid communication between the manifold and the primary gas burner;

an auxiliary supply line providing fluid communication between the manifold and the auxiliary gas burner;

a bridge line providing fluid communication between the primary supply line and the auxiliary supply line;

a supplemental line providing fluid communication between the manifold and the bridge line;

a bridge line valve operably coupled to the bridge line for regulating the flow of fuel through the bridge line;

a supplemental line valve operably coupled to the supplemental line for regulating the flow of fuel through the supplemental line; and a controller in operative communication with the temperature probe, the controller being configured to:

initiate an operation of the bridge line valve and the supplemental line valve in an auto griddle mode where the flow of fuel is supplied to operate the primary gas burner and the auxiliary gas burner at a target heat level;

obtain a griddle temperature of the griddle using the temperature probe;

determine that the griddle temperature changes at a rate that is below a predetermined heating rate when the auto griddle mode is initiated;

identify a heating failure corresponding to a failure of the bridge line valve to open; and implement a responsive action in response to identifying the heating failure.

* * * * *